Aug. 22, 1944.  F. W. SNODGRASS  2,356,281
PROJECTILE LOADING
Filed Feb. 15, 1944
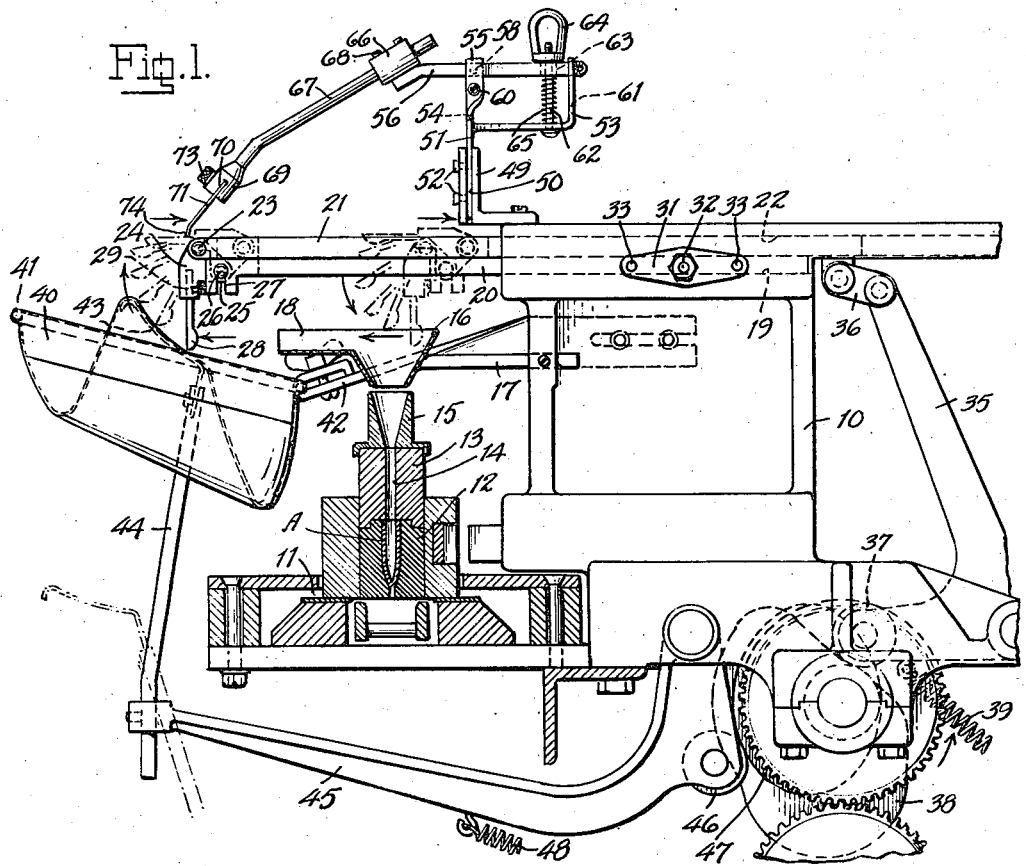
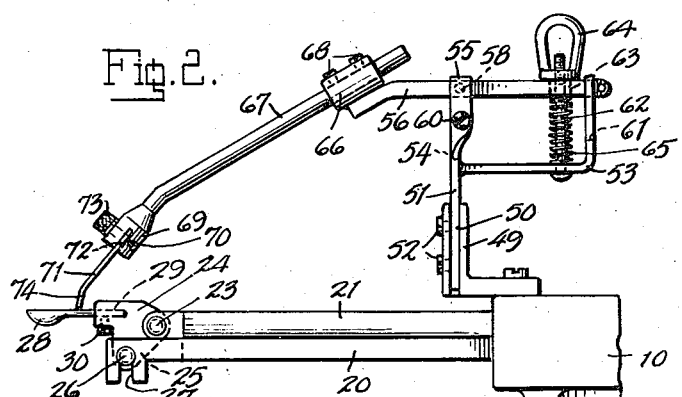
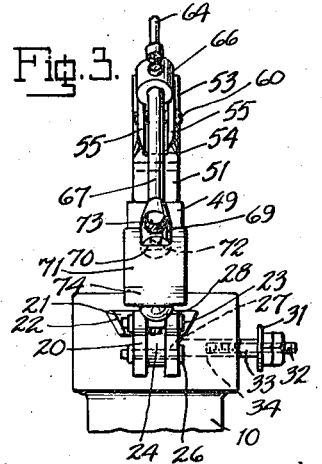
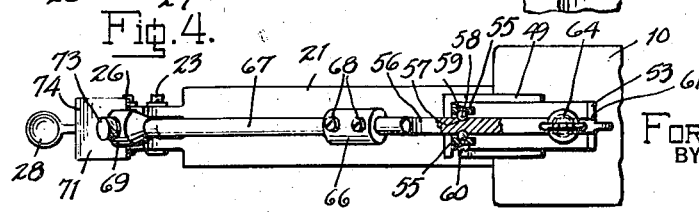
INVENTOR
FORREST W. SNODGRASS.
BY
ATTORNEYS Patented Aug. 22, 1944

2,356,281

UNITED STATES PATENT OFFICE 2,356,281

PROJECTILE LOADING

Forrest W. Snodgrass, Denver, Colo., assignor to Remington Arms Company, Inc., Bridgeport, Conn., a corporation of Delaware Application February 15, 1944, Serial No. 522,421

5 Claims. (Cl. 86—31)

The present invention relates to bullet charging apparatus, particularly of the type adapted for charging bullets with measured tracer or igniter charges. This type of charge material is of a fluffy nature, and the charging machine is provided with a charging spoon automatically actuated to scoop the tracer material from a bag and thereupon carry it into relation with a funnel through which it is dropped into the bullet. Following the scooping operation the charging spoon is moved in a horizontal position and at the beginning of such movement is engaged by a wiping means to level off the tracer charge so that the amount of charge is accurately measured. The present invention relates particularly to a wiper mechanism for leveling the charge in the tracer charging spoon, and has for an object to provide a mechanism of this character capable of extremely accurate and maximum adjustment as to position and tension to the end that its cooperation with the spoon may be accurately controlled.

A further object is to provide a wiper mechanism yieldably mounted so that a predetermined wiping pressure may be exerted upon the spoon. Another object is to provide a wiper mechanism in which the wiping element is in the form of a wiper plate, capable of being readily removed for the purpose of convenient replacement.

With the above and other objects in view, an embodiment of the invention is shown in the accompanying drawing, and this embodiment will be hereinafter more fully described with reference thereto and the invention will be finally pointed out in the claims.

In the drawing:

Fig. 1 is a side elevation, partially in vertical section, of a tracer charging machine in which the wiper mechanism of the invention is incorporated.

Fig. 2 is a side elevation on a slightly enlarged scale of the wiper mechanism, showing it in engagement with the horizontally positioned tracer charging spoon.

Fig. 3 is an end elevation of the wiper mechanism as shown in Fig. 2.

Fig. 4 is a plan view thereof, partially in section.

Similar reference characters indicate corresponding parts throughout the several figures of the drawing.

Referring to the drawing, the tracer charging machine comprises a frame 10 mounted in relation to the bullet feeding mechanism, illustrated as a belt feed 11 adapted to successively carry the bullets into relation with a series of stations to perform various operations thereon, one such operation being the tracer charging operation illustrated. The bullet A is carried in a pocket member 12 engaged at its upper side by a block member 13 having a vertical tracer charge guide passage 14 therein extending to the open end of the vertically disposed bullet, a funnel member 15 being engaged upon the upper end of the block member 13. These parts are disposed by the feed belt in register beneath a funnel member 16 supported by a rod 17 from the frame 10, this funnel member 16 being provided with a lateral channel portion 18 extending at one side through which the charging spoon moves in its return passage from the funnel to the powder bag, as will presently more fully appear.

In the upper side of the frame 10 there is provided a horizontal slideway 19 in which a slide bar 20 is mounted for reciprocatory movement, a second slide bar 21 being superimposed upon the bar 20 and guided in a dovetail slideway 22 provided in the frame 10 above in the slideway 19. At its forward slotted end the slide bar 21 has pivotally mounted thereon by means of a pivot pin 23 a charging spoon carrying arm 24, provided with a link extension portion 25 connected to the forward slotted end of the slide bar 20 by means of a horizontal pin 26 therein, slidably engaged in a vertical slot 27 in the forward end portion of the slide bar 20. The disposition of the link portion 25 with respect to the pins 23 and 26 and the slot 27 is such that in either the vertically or the horizontally moved position of the arm 24 the link portion assumes a 45° angular position between the pins 23 and 26 with the pin 26 at the upper end of the slot. The tracer charging spoon 28 is secured in a slot 29 in the arm 24 by means of a set screw 30.

The charging spoon is adapted to swing between its vertical and horizontal positions through swinging movement imparted to the arm 24 through sliding movement of the slide bar 21 relative to the slide bar 20, while the latter remains stationary. For this purpose the slide bar 20 is engaged at its side by a friction device comprising a leaf spring member 31 adjustably mounted upon a stud 32 secured to the frame 10, and provided at its ends with friction pins 33 engaged through guide passages 34 with the side surface of the slide bar 20, this friction device retaining the slide bar 20 against movement in the absence of positive feeding pressure exerted thereon. The link portion 25 of the arm 24 constitutes the positive driving connection between the bars 20 and 21.

Reciprocatory movement is imparted to the slide bar 21 by means of a cam actuated lever 35 connected thereto by a link 36, the cam roller 37 carried by the lever being engaged with a cam 38 through the action of a spring 39.

The path of movement of the charging spoon is shown by the arrows in Fig. 1. The vertical projected position of the spoon is shown at the left in full lines. Starting from this point, the upper slide bar 21 is retracted, and during the initial retracting movement the spoon is swung upwardly to the horizontal position shown by the dot-and-dash lines, the lower slide bar 20 remaining stationary through the retaining action of the friction device during this initial retracting movement and the upward swinging movement of the spoon. The two slides thereupon move together, the horizontally positioned spoon being carried in retracting direction to the dotted line right hand position, this being the limit of the retracting movement of the slides. Thereupon the upper slide 21 starts its projecting movement, the initial movement causing the spoon to swing downwardly to its vertical position, shown by the dot-and-dash lines, and dropping its contents into the funnel 16, the lower slide bar 20 remaining stationary during this downward swinging movement. As soon as the spoon reaches its vertical position the two slides move together, carrying the vertically disposed spoon from the dot-and-dash line position at the right to the full line position at the left, thus completing the cycle.

During the swinging movement of the spoon upwardly, it scoops up a charge of tracer mixture from the bag 40, this bag being hung from its upper edge upon a rectangular frame 41 supported from the frame 10 by means of a bracket arm 42. The central bottom portion of the bag is engaged by a lifting arm 43, of arcuate shape substantially corresponding to the path of movement of the spoon, this lifting arm being supported upon an adjustable rod 44 secured to the end of a cam actuated lever 45 having its cam roller 46 engaged with a cam 47 through the action of a spring 48. During each cycle of feeding movement of the spoon the lifting arm 43 moves from its lower position, shown by dot-and-dash lines in Fig. 1, to its upper position forcing upwardly the center of the bag and carrying the tracer mixture upon the raised arcuately disposed bottom surface of the bag carried thereby, and from which it is scooped up by the spoon during its upward swinging movement.

Upon the upper side of the frame 10 there is secured an angle bracket 49, provided with a vertical slot 50 in which the supporting frame of the wiper mechanism is engaged, this supporting frame being preferably formed from welded flat strip stock and comprising a vertically disposed strip portion 51 engaged at its lower portion in the vertical slot 50 and adjustably secured therein by set screws 52, and a right angularly bent strip portion 53, welded to the rearward side of the strip portion 51 intermediate its ends to provide a U-shaped frame section. The strip portion 51 is provided at its upper portion with a slot opening 54 and is formed into a yoke by bending the upper end portions 55—55 of the strip at each side of the slot opening at right angles to the plane of the strip. Within this yoke there is pivotally mounted a connecting bar 56 of rectangular cross section provided at its opposed sides with spherical pockets 57—57 engaged by ball bearing members 58—58, seated in conical pockets 59—59 formed in the opposed surfaces of the yoke sides 55, these yoke sides being held under adjustable tension against the ball bearings by means of a tightening screw 60 extending between the yoke sides. The vertical arm of the strip portion 53 of the frame is provided with a vertical slot opening 61 in which the outer end of the connecting bar 56 is movably engaged. Upon the horizontal arm of the strip portion 53 there is mounted a vertical guide rod 62 engaged through a slot 63 in the connecting bar 56 and provided upon its upper threaded end with a thumb nut 64, a spring 65 being provided upon the guide rod between the frame and the connecting bar.

Upon the forward end of the connecting bar 56 there is provided a tubular cylindrical bearing member 66 disposed at a forwardly and downwardly inclined angle to the bar, being preferably secured thereto by welding. Within the tubular bearing 66 there is mounted for longitudinal and rotary adjustment the wiper tool supporting arm 67, being secured in its adjusted position by means of set screws 68—68. The arm 67 is provided at its forward end with a clamping head 69, disposed at a forwardly and downwardly inclined angle to the axis of the arm, and provided with a slot 70 in which the wiper plate 71 is engaged, the latter being provided at its upper edge with an open ended slot opening 72 engaged by the tightening screw 73 of the clamping head, tightening of which compresses the clamping head to secure the wiper plate therein. The marginal edge portion of the wiper plate is bent at a forwardly and downwardly inclined angle thereto, as at 74, and is so adjusted that it normally engages the upper flat side of the charging spoon under slight pressure as the spoon is swung upwardly to its horizontal position, the point of engagement being along the handle portion of the spoon. As the spoon is carried rearwardly the wiper plate engages its upper flat surface under slight pressure and levels the tracer charge of powder carried therein, the wiped off surplus dropping into the bag 40. The scraper may be slightly clear of the spoon, or the spoon may be twisted slightly so that one side of the spoon touches the scraper and the other does not.

The form of the invention illustrated in the drawing and described herein is typical and illustrative only, and it is evident that the invention is capable of embodiments in other forms, all falling within the scope of the appended claims, which are to be broadly construed.

What is claimed is:

1. In a wiper mechanism for removing surplus material from a horizontally movable material conveying receptacle, a support, a substantially horizontally disposed bar member pivotally supported thereby, a bearing sleeve secured to the forward end of said bar member disposed at a downwardly and forwardly inclined angle thereto, a wiper carrying arm engaged in said bearing sleeve for longitudinal and rotary adjustment therein, and including a clamping head disposed at a downwardly and forwardly inclined angle to the axis of said arm, and a wiper plate removably secured in said clamping head adapted to engage the upper surface of said receptacle to remove surplus material therefrom upon relative horizontal movement of said receptacle beneath said wiper plate.

2. In a wiper mechanism for removing surplus material from a horizontally movable material conveying receptacle, a support comprising an upright bearing yoke portion and a right angular frame portion secured thereto having a horizontal base part and an upright slotted guide part laterally opposed to said yoke portion, a substantially horizontally disposed bar member pivotally mounted intermediate its ends in said yoke portion and engaged at its rearward end for swinging movement in said slotted guide part, a movement limiting post secured to said horizontal frame part and engaged through said bar, an adjustable nut engaged upon said post at the upper side of said bar, a spring engaged about said post between said bar and said horizontal frame part, and a wiper element carried by and movable with said bar member adapted to engage the upper side of said receptacle whereby surplus material is removed therefrom upon relative horizontal movement of said receptacle beneath said wiper element.

3. In a wiper mechanism for removing surplus material from a horizontally movable material conveying receptacle, a support comprising an upright bearing yoke portion and a right angular frame portion secured thereto having a horizontal base part and an upright slotted guide part laterally opposed to said yoke portion, a substantially horizontally disposed bar member pivotally mounted intermediate its ends in said yoke portion and engaged at its rearward end for swinging movement in said slotted guide part, a movement limiting post secured to said horizontal frame part and engaged through said bar, an adjustable nut engaged upon said post at the upper side of said bar, a spring engaged about said post between said bar and said horizontal frame part, a bearing sleeve secured to the forward end of said bar member disposed at a downwardly and forwardly inclined angle thereto, a wiper carrying arm engaged in said bearing sleeve for longitudinal and rotary adjustment therein and including a clamping head disposed at a downwardly and forwardly inclined angle to the axis of said arm, and a wiper plate removably secured in said clamping head adapted to engage the upper surface of said receptacle to remove surplus material therefrom upon relative horizontal movement of said receptacle beneath said wiper plate.

4. In a wiper mechanism for removing surplus bullet charging tracer mixture from a horizontally movable tracer mixture conveying spoon, a support, a bar member pivotally supported thereby, and a wiper element carried by and movable with said bar member arranged to engage the upper side of said spoon whereby surplus tracer mixture is removed therefrom upon relative horizontal movement of said spoon beneath said wiper element.

5. In combination, a tracer charging machine for charging bullets with tracer mixture and including a horizontally movable tracer mixture conveying spoon, a support mounted upon said machine, a bar member pivotally supported thereby, and a wiper element carried by and movable with said bar member adapted to engage the upper side of said spoon whereby surplus tracer mixture is removed therefrom upon relative horizontal movement of said spoon beneath said wiper element.

FORREST W. SNODGRASS.